Sept. 5, 1939.   G. M. FITTS   2,171,925
FASTENING DEVICE
Filed March 23, 1937
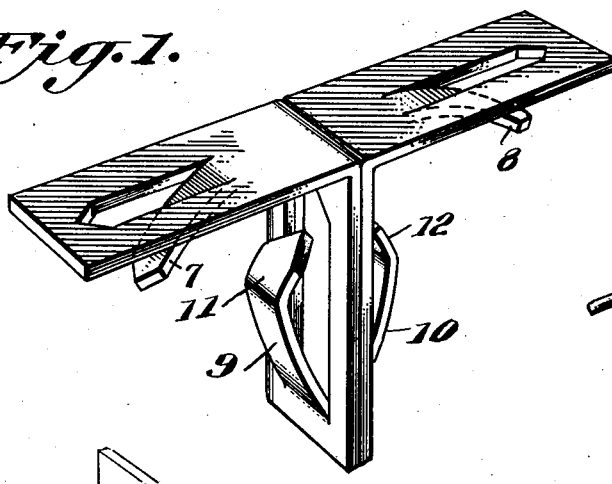
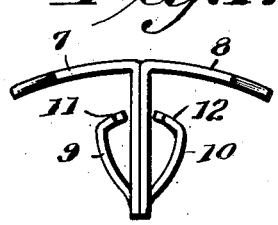
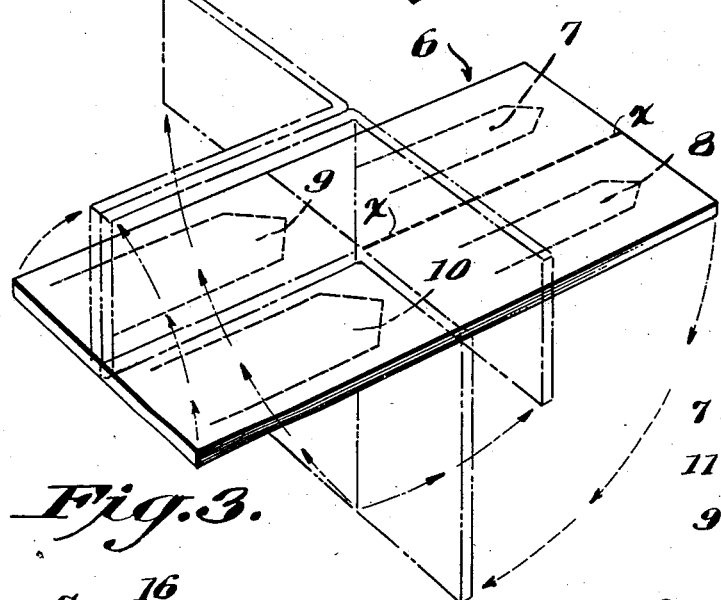
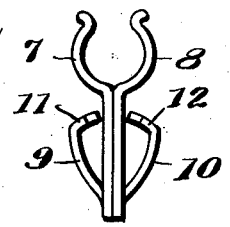
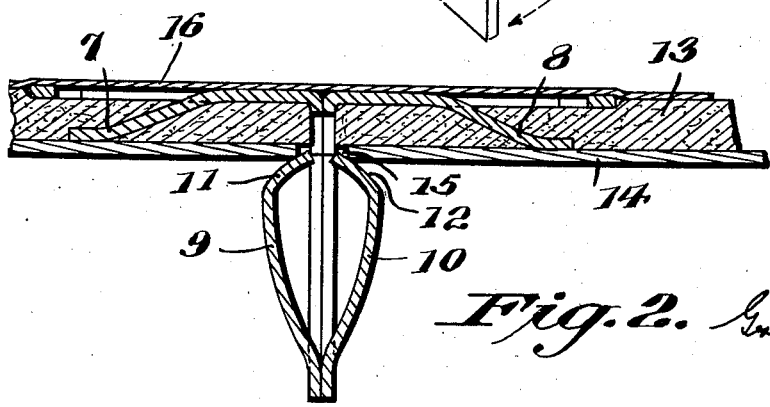
Inventor
George M. Fitts Patented Sept. 5, 1939

2,171,925

UNITED STATES PATENT OFFICE 2,171,925

FASTENING DEVICE

George M. Fitts, Washington, D. C.

Application March 23, 1937, Serial No. 132,654

8 Claims. (Cl. 85—5)

This invention relates generally to fastening devices, with more particular reference to self-setting spring fasteners adapted to secure in superposed relationship panel framings, supports or sheets structures. The invention has primarily in view an inexpensive and effective device for fastening and retaining in superposed relationship a plurality of sheets where it is necessary or desirable that a strong, dependable, inexpensive, easily and quickly applied fastening installation be employed, particularly where an efficient fastener of comparatively small dimensions is, for practical purposes, necessary.

Heretofore, to a large extent, it has been the common practice in fastening superposed sheets, panels, or similar sections to employ the conventional bolt and nut, or the push-type fastener or clip. However, in situations where a fastener may be applied from one side only a bolt-and-nut installation is impracticable and it is necessary to resort to some expensive and more or less cumbersome device operable from the exposed or accessible side. As for the push-type fastener or clip, it is thought to be of common knowledge that their efficiency depends upon the resiliency of the legs abutting the side walls of the aperture through which they are inserted for retaining them in place and that, therefore, they cannot provide a tight, rigid fastening and are subject to loosening from vibration and jarring with probably ultimate dislodgment.

The principal object of the present invention is the provision of a fastening device of general utility in its field, of integral structure, thereby minimizing cost of manufacture and maximizing structural permanency, light in weight and efficient in function, and which may be applied from one side of the overlying sheets to be secured togther.

My invention will be more readily understood by reference to the accompanying drawing, in which Fig. 1 is a perspective view of a fastener embodying my invention, for the sake of clarity on a somewhat enlarged scale;

Fig. 2 is a substantially central longitudinal cross-sectional view of the device shown in Fig. 1, after application;

Fig. 3 is a diagrammatic perspective view outlining the preferred method of manufacture, and Figs. 4 and 5 are end elevations of modified forms of the preferred construction, hereinafter more particularly described.

Referring now to the drawing in detail, the fastener of my invention is formed from a flat, rectangular, sheet-metal blank, preferably spring steel, such as the blank 6 shown in Fig. 3. From this blank are struck the initially depending and preferably pointed legs 7 and 8 on one side of a central dividing line and 9 and 10 on the other. This is the result of a common and well-known die-stamping operation, and preferably by the same operation the blank is slit through one-half its length along the line $x$—$x$. And, also preferably by the same operation, the legs 9 and 10 are partially bent back upon themselves to form cam surfaces 11 and 12, as clearly shown in Fig. 1.

The stamped and slitted blank is then folded upon itself as indicated by the arrows in Fig. 3, the slit sections at one end being bent rectangularly away from each other giving the now complete structure the form shown in Fig. 1.

Illustrated in Fig. 3 of the drawing is one example of the application of my invention as applied to a typical construction wherein the material 13 represents one or more layers of cardboard of a penetratable nature adapted to be secured to a body or base 14, which in this instance is of metal. Consequently the position of the legs 7 and 8, by reason of their pointed ends, enables them to penetrate the superposed material 13, thus anchoring the fastener and material together.

As illustrated, the base or body 14 is provided with an aperture 15 to which is secured the material 13 by means of my fastener. While, as herein described, the material is of cardboard and of a penetratable nature, it is to be understood that material of a different substance may be employed and that apertures may be provided therein to receive the legs. Also, the base or body 14 may be of a different material or construction.

The application of my invention consists of anchoring the fastener to the material 13, through the medium of the legs 7 and 8, and inserting the same through the aperture in the body 14. The legs 9 and 10 being compressed during this operation expand, due to their inherent resiliency, after insertion, the degree of expansion being controlled by the cam surfaces 11 and 12 coacting with the walls of the aperture 15 as clearly shown in Fig. 2 of the drawing.

It is therefore apparent, that the normal expansion of the legs coacting with the walls of the aperture 15 of the body, after insertion will secure the material and body in a locked condition.

If desirable, a suitable covering 16, such as cloth, paper or the like may be secured to the outer face of the material 13.

That portion of the blank 6 equipped with the legs 7 and 8 may be modified to the extent of utilizing said entire portion to form the legs as shown in Fig. 4. While this view depicts the legs as being curved in the same manner as Fig. 1, they may be folded in the opposite direction, as illustrated in Fig. 5, to form a retaining means for a conduit, wire or any desirable article.

From the foregoing it will be seen that the construction lends itself to economical manufacture and adaptation in many ways, for example, the legs struck out from each thickness of material, the entire structure so formed that it can be inserted in an aperture no larger than the thickness of the fastener itself, a leg may be formed from each section of bent sheet metal, certain portions are bent back upon themselves, no waste of material and in some instances, performing the dual function of locking the superposed material together and serving to retain another article in fixed position. Furthermore, the blank may be cut from a continuous strip of material fed into a suitable machine for forming and even inserting the fastener.

Particular reference is had to the legs 7 and 8, when juxtapositioned in relation to the body, as illustrated in the several views of the drawing, which tend, due to their inherent resiliency, to further effect a binding action between the various parts.

It is therefore to be distinctly understood that many changes in sizes, material, shapes and conformations may readily be resorted to without departing from the spirit of the invention and scope of the appended claims.

Having thus disclosed my invention, I claim:

1. An integral and wholly self-contained fastener for superposed sheets formed from a blank of resilient metal slitted throughout a portion of its length, the unslit portion of the blank being folded upon itself to provide a penetrating shank and the slitted sections being bent away from each other to provide a head, and oppositely-disposed leg members interiorly struck from the unslit section of said blank and bent outwardly to provide diverging and resilient locking projections adapted to be placed under tension in work-holding positions.

2. An integral and wholly self-contained fastener for superposed sheets formed from a blank of resilient metal slitted throughout a portion of its length, the unslit portion of the blank being folded upon itself to provide a penetrating shank and the slitted sections being bent away from each other in substantially rectangular disposition at their bases with reference to said shank to provide a head, and two oppositely-disposed leg members interiorly struck from the unslit section of said blank and bent outwardly to provide diverging and resilient locking projections adapted to be placed under tension in work-holding positions.

3. An integral and wholly self-contained fastener for superposed sheets formed from a blank of resilient metal slitted throughout a portion of its length, the unslit portion of the blank being folded upon itself to provide a penetrating shank and the slitted sections being bent away from each other to provide a head, and two oppositely-disposed leg members interiorly struck from the unslit section of said blank and bent outwardly to provide diverging and resilient locking projections adapted to be placed under tension in work-holding positions, the free ends of said leg members being reentrantly bent to provide toe-portions adapted for direct engagement with the work.

4. An integral and wholly self-contained fastener for superposed sheets formed from a blank of resilient metal slitted throughout a portion of its length, the unslit portion of the blank being folded upon itself to provide a penetrating shank and the slitted sections being bent away from each other to provide a head, leg members interiorly struck from the unslit section of said blank and bent outwardly to provide diverging and resilient locking projections adapted to be placed under tension in work-holding positions, and leg members interiorly struck from said head sections and depending therefrom adapted to penetrate the material of the work and stabilize the union of fastener and work.

5. An integral and wholly self-contained fastener for superposed sheets formed from a blank of resilient metal slitted throughout a portion of its length, the unslit portion of the blank being folded upon itself to provide a duplex shank having struck therefrom diverging and resilient locking projections of reentrant configuration and the slitted sections being bent away from each other to provide a head.

6. An integral and wholly self-contained fastener for superposed sheets formed from a blank of resilient metal slitted throughout a portion of its length, the unslit portion of the blank being folded upon itself to provide a duplex shank and the slitted sections being bent away from each other to provide a head curved to insure tension between head and shank.

7. An integral and wholly self-contained fastener for superposed sheets formed from a blank of resilient metal slitted throughout a portion of its length the unslit portion of the blank being folded upon itself to provide a duplex shank and the slitted sections being bent away from each other to provide a head, and legs struck from the opposite head portions to penetrate the work and stabilize the union of fastener and work.

8. An integral and wholly self-contained fastener for superposed sheets formed from a blank of resilient metal longitudinally slitted at one end thereof, the unslit portion of the blank being folded upon itself to provide a penetrating shank and the slitted sections being bent away from each other to provide a head, and leg members interiorly struck from the unslit section of said blank and bent outwardly to provide diverging and resilient locking projections adapted to be placed under tension in work-holding positions.

GEORGE M. FITTS.